US010484406B2

(12) United States Patent
Vasseur et al.

(10) Patent No.: US 10,484,406 B2
(45) Date of Patent: Nov. 19, 2019

(54) DATA VISUALIZATION IN SELF-LEARNING NETWORKS

(71) Applicant: Cisco Technology, Inc., San Jose, CA (US)

(72) Inventors: Jean-Philippe Vasseur, Anchorage, AK (US); Grégory Mermoud, Veyras (CH); Sukrit Dasgupta, Norwood, MA (US); Xav Laumonier, Saint-Denis (FR)

(73) Assignee: Cisco Technology, Inc., San Jose, CA (US)

( * ) Notice: Subject to any disclaimer, the term of this patent is extended or adjusted under 35 U.S.C. 154(b) by 303 days.

(21) Appl. No.: 14/990,064

(22) Filed: Jan. 7, 2016

(65) Prior Publication Data

US 2016/0219071 A1    Jul. 28, 2016

Related U.S. Application Data

(60) Provisional application No. 62/106,468, filed on Jan. 22, 2015.

(51) Int. Cl.
*G06F 11/00* (2006.01)
*G06F 12/14* (2006.01)
*G06F 12/16* (2006.01)
*G08B 23/00* (2006.01)
*H04L 29/06* (2006.01)
*G06N 20/00* (2019.01)

(52) U.S. Cl.
CPC ...... *H04L 63/1425* (2013.01); *H04L 63/1416* (2013.01); *G06N 20/00* (2019.01)

(58) Field of Classification Search
CPC ............ H04L 63/1425; H04L 63/1416; G06N 99/005
See application file for complete search history.

(56) References Cited

U.S. PATENT DOCUMENTS

| 8,887,286 B2 | 11/2014 | Dupont et al. | |
|---|---|---|---|
| 9,578,055 B1 * | 2/2017 | Khanal | H04L 63/1458 |
| 2005/0138483 A1 * | 6/2005 | Hatonen | G06F 11/3466 714/45 |

(Continued)

FOREIGN PATENT DOCUMENTS

CN    1507233 A    6/2004

OTHER PUBLICATIONS

Zhao et al. "FluxFlow Visual Analysis of Anomalus Information Spreading on Social Media"; Dec. 2014; pp. 1-10.

*Primary Examiner* — John B King
*Assistant Examiner* — Darshan I Dhruv
(74) *Attorney, Agent, or Firm* — Behmke Innovation Group LLC; James Behmke; Stephen D. LeBarron

(57) ABSTRACT

In one embodiment, a first device in a network maintains raw traffic flow information for the network. The first device provides a compressed summary of the raw traffic flow information to a second device in the network. The second device is configured to transform the compressed summary for presentation to a user interface. The first device detects an anomalous traffic flow based on an analysis of the raw traffic flow information using a machine learning-based anomaly detector. The first device provides at least a portion of the raw traffic flow information related to the anomalous traffic flow to the second device for presentation to the user interface.

17 Claims, 11 Drawing Sheets

(56) References Cited

U.S. PATENT DOCUMENTS

| | | | |
|---|---|---|---|
| 2006/0287842 A1* | 12/2006 | Kim | G01H 9/004 702/183 |
| 2009/0073895 A1* | 3/2009 | Morgan | H04L 63/0227 370/255 |
| 2009/0144410 A1* | 6/2009 | Fink | H04L 43/062 709/224 |
| 2009/0265784 A1* | 10/2009 | Waizumi | H04L 63/1458 726/23 |
| 2010/0082513 A1* | 4/2010 | Liu | H04L 63/1458 706/46 |
| 2011/0154132 A1* | 6/2011 | Aybay | H04L 43/026 714/49 |
| 2011/0213788 A1 | 9/2011 | Zhao et al. | |
| 2012/0096150 A1* | 4/2012 | Chang | H04L 43/045 709/224 |
| 2012/0099431 A1* | 4/2012 | Hou | H04L 47/266 370/235 |
| 2012/0151044 A1* | 6/2012 | Luna | H04W 4/18 709/224 |
| 2012/0216282 A1* | 8/2012 | Pappu | H04L 63/1416 726/23 |
| 2012/0233311 A1* | 9/2012 | Parker | H04L 43/00 709/224 |
| 2012/0296899 A1* | 11/2012 | Adams | G16H 10/40 707/736 |
| 2013/0031037 A1* | 1/2013 | Brandt | H04L 63/1408 706/12 |
| 2013/0247191 A1* | 9/2013 | Balasubramanian | G06F 21/562 726/23 |
| 2013/0291099 A1* | 10/2013 | Donfried | G06Q 30/0637 726/22 |
| 2013/0298244 A1* | 11/2013 | Kumar | G06F 21/52 726/25 |
| 2013/0318238 A1* | 11/2013 | Hall | H04L 43/028 709/224 |
| 2014/0096194 A1* | 4/2014 | Bhogavilli | H04L 63/0236 726/3 |
| 2014/0165207 A1* | 6/2014 | Engel | H04L 63/1425 726/25 |
| 2014/0325649 A1* | 10/2014 | Zhang | H04L 43/024 726/23 |
| 2014/0373136 A1* | 12/2014 | Igelka | H04L 63/1441 726/22 |
| 2015/0163249 A1* | 6/2015 | Bezilla | G06F 21/552 726/1 |
| 2015/0193694 A1 | 7/2015 | Vasseur et al. | |
| 2015/0207809 A1* | 7/2015 | Macaulay | G06F 21/552 726/22 |
| 2015/0341379 A1* | 11/2015 | Lefebvre | H04L 63/1425 726/22 |
| 2016/0036838 A1* | 2/2016 | Jain | H04L 63/1416 726/23 |
| 2016/0173526 A1* | 6/2016 | Kasman | H04L 63/1458 726/23 |
| 2016/0330225 A1* | 11/2016 | Kroyzer | G06F 21/552 |
| 2017/0230229 A1* | 8/2017 | Sasturkar | G06F 11/0709 |

\* cited by examiner

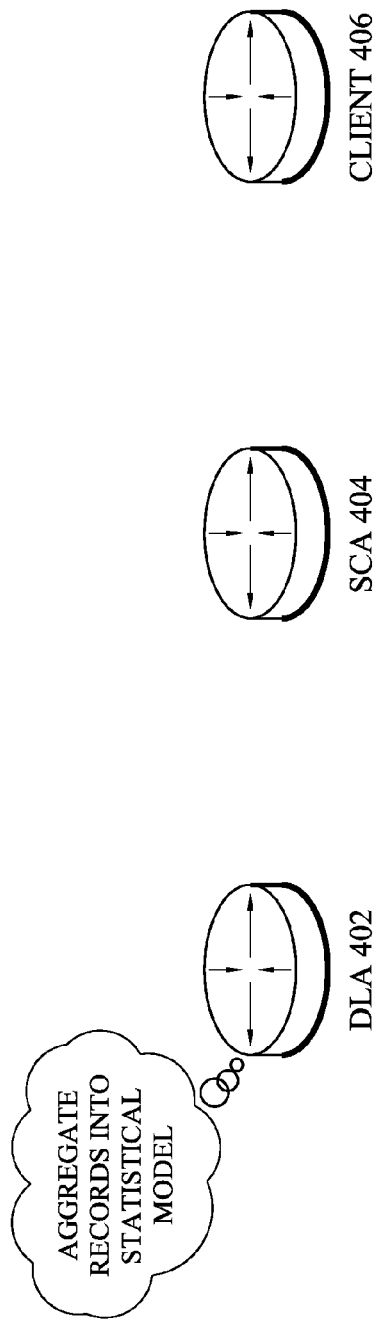
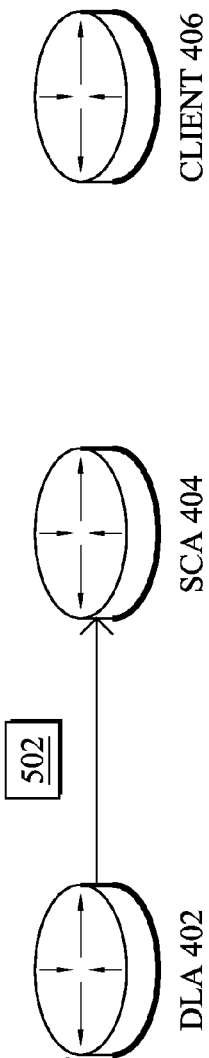
FIG. 5A
FIG. 5B

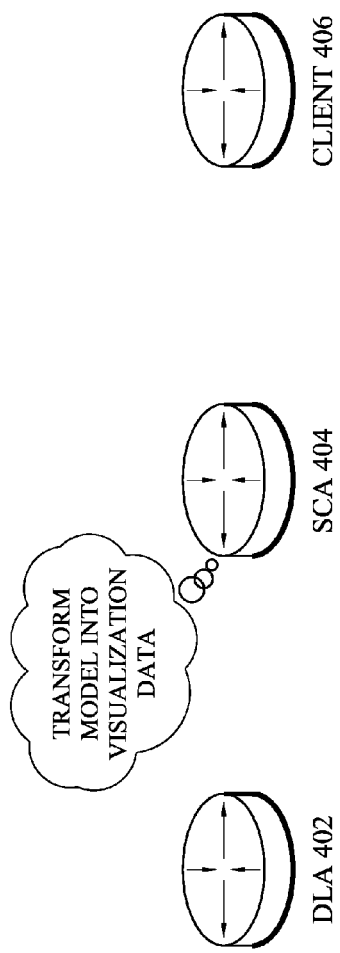
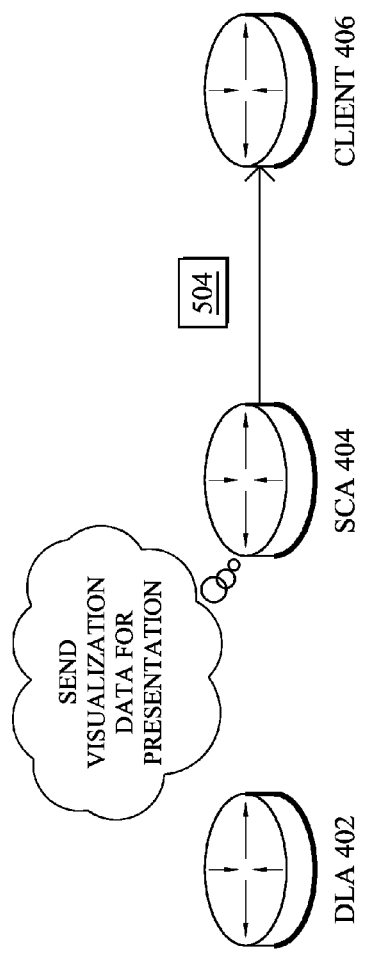

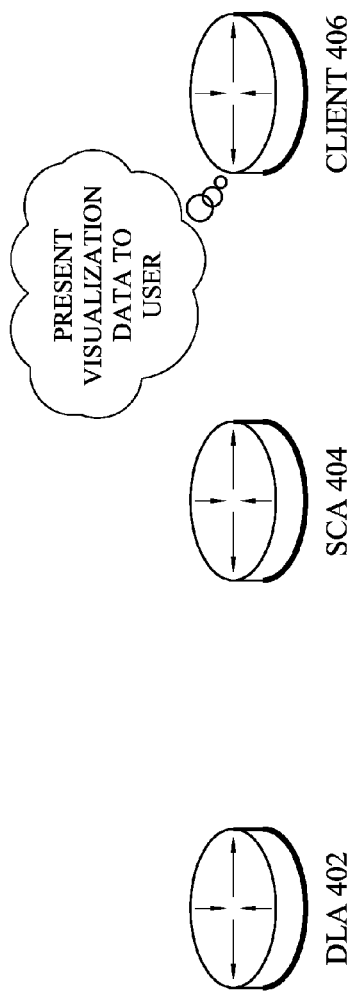
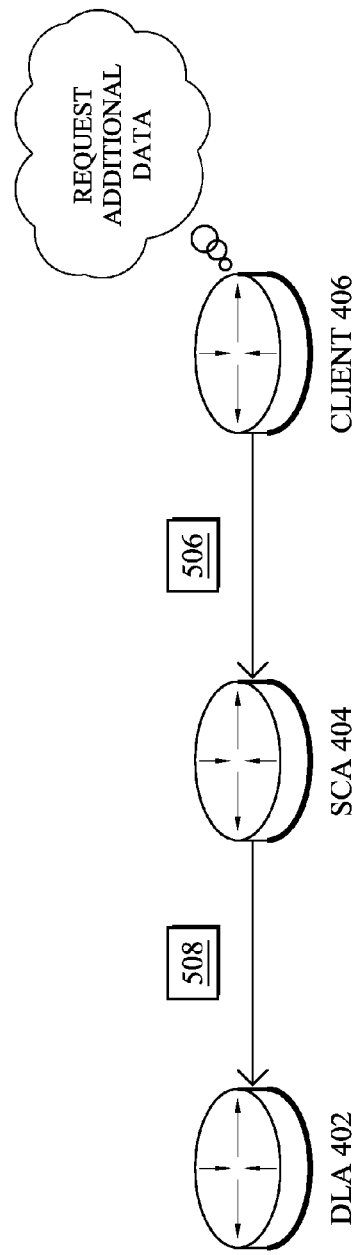

DATA VISUALIZATION IN SELF-LEARNING NETWORKS

RELATED APPLICATIONS

This application claims priority to U.S. Provisional Application No. 62/106,468, filed Jan. 22, 2015, entitled: "DATA VISUALIZATION IN SELF LEARNING NETWORKS," by Vasseur et al., the contents of which are herein incorporated by reference.

TECHNICAL FIELD

The present disclosure relates generally to computer networks, and, more particularly, to data visualization in self-learning networks.

BACKGROUND

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5G illustrate examples of the operation of SLN devices;

DESCRIPTION OF EXAMPLE EMBODIMENTS

Overview

Figure 1A:
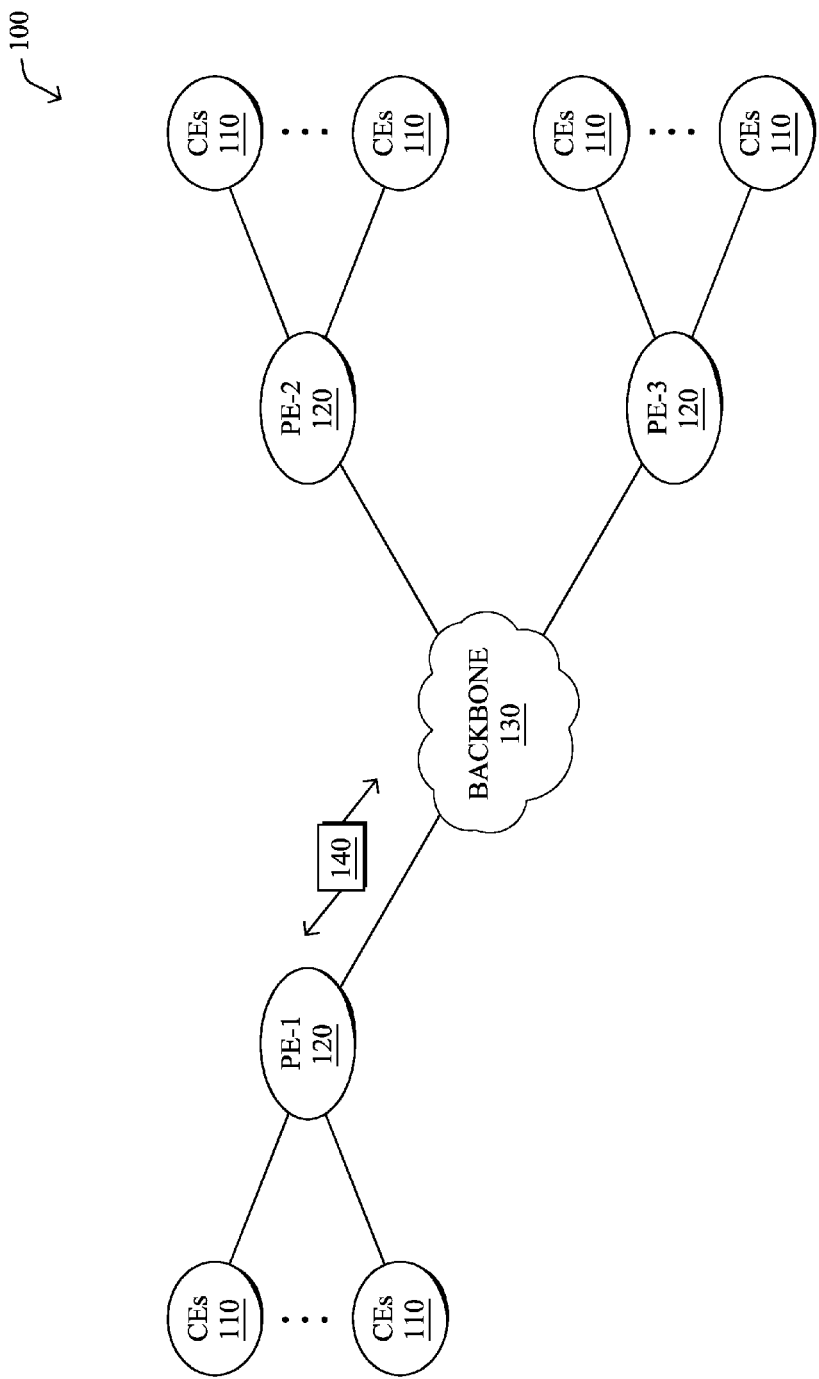
FIGS. 1A-1B illustrate an example communication network.

According to one or more embodiments of the disclosure, a first device in a network maintains raw traffic flow information for the network. The first device provides a compressed summary of the raw traffic flow information to a second device in the network. The second device is configured to transform the compressed summary for presentation to a user interface. The first device detects an anomalous traffic flow based on an analysis of the raw traffic flow information using a machine learning-based anomaly detector. The first device provides at least a portion of the raw traffic flow information related to the anomalous traffic flow to the second device for presentation to the user interface.

In further embodiments, an apparatus is disclosed that includes: one or more network interfaces to communicate with a network, a processor coupled to the network interfaces and adapted to execute one or more processes, and a memory configured to store a process executable by the processor. When executed, the process is configured to receive a compressed summary of raw traffic flow information from one or more devices in the network. The process is further configured to transform the compressed summary of raw traffic flow information for presentation to a user interface. The process is additionally configured to provide the transformed summary of raw traffic flow information to the user interface. The process is also configured to request at least a portion of the raw traffic flow information from the one or more devices. The requested portion of the raw traffic flow information is related to an anomalous traffic flow detected by one of the one or more devices. The process is additionally configured to provide the requested at least a portion of the raw traffic flow information to the user interface.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
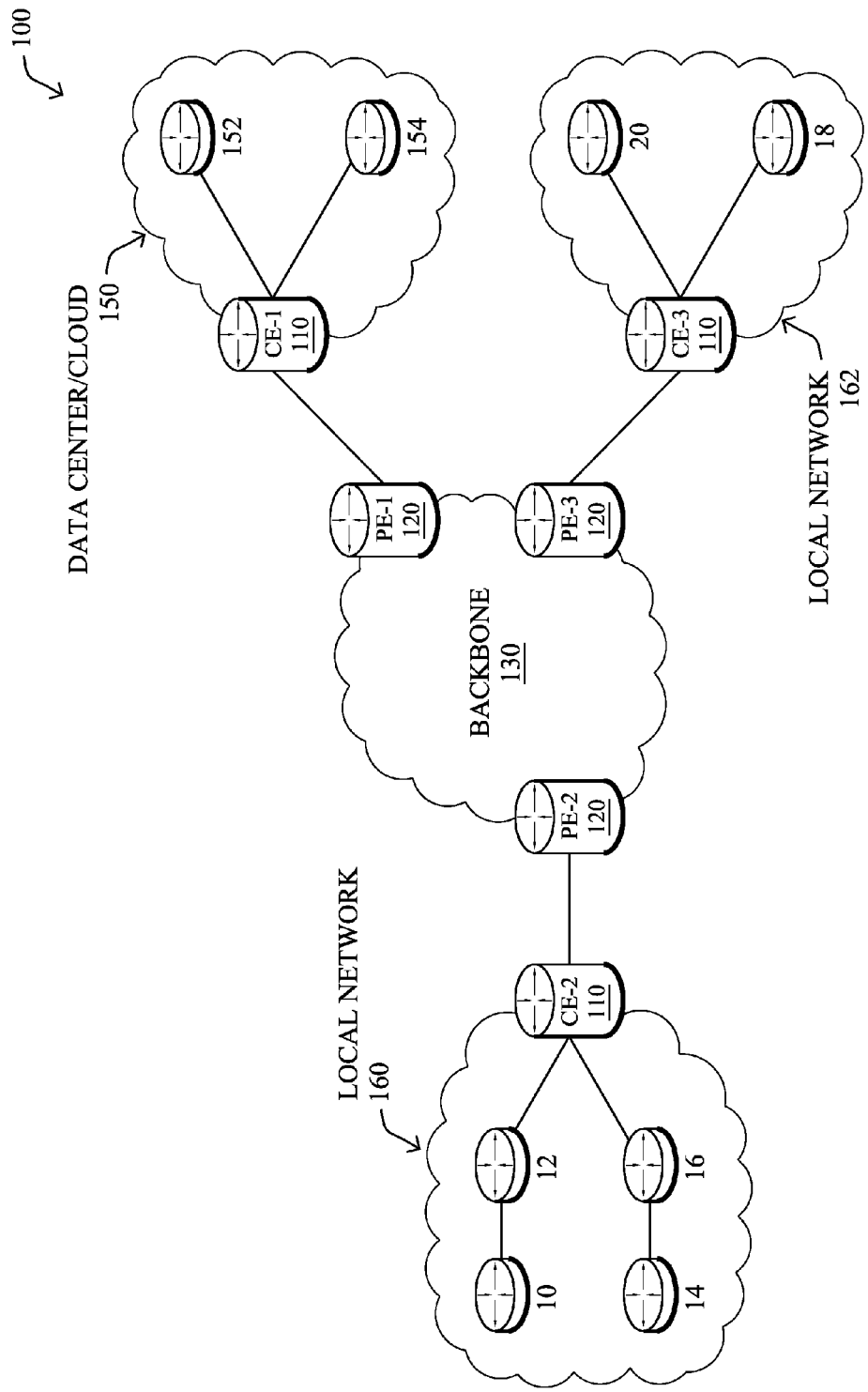

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, devices, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., is are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability.

LLNs are comprised of anything from a few dozen to thousands or even millions of LLN routers, and support point-to-point traffic (between devices inside the LLN), point-to-multipoint traffic (from a central control point such as at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical devices), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
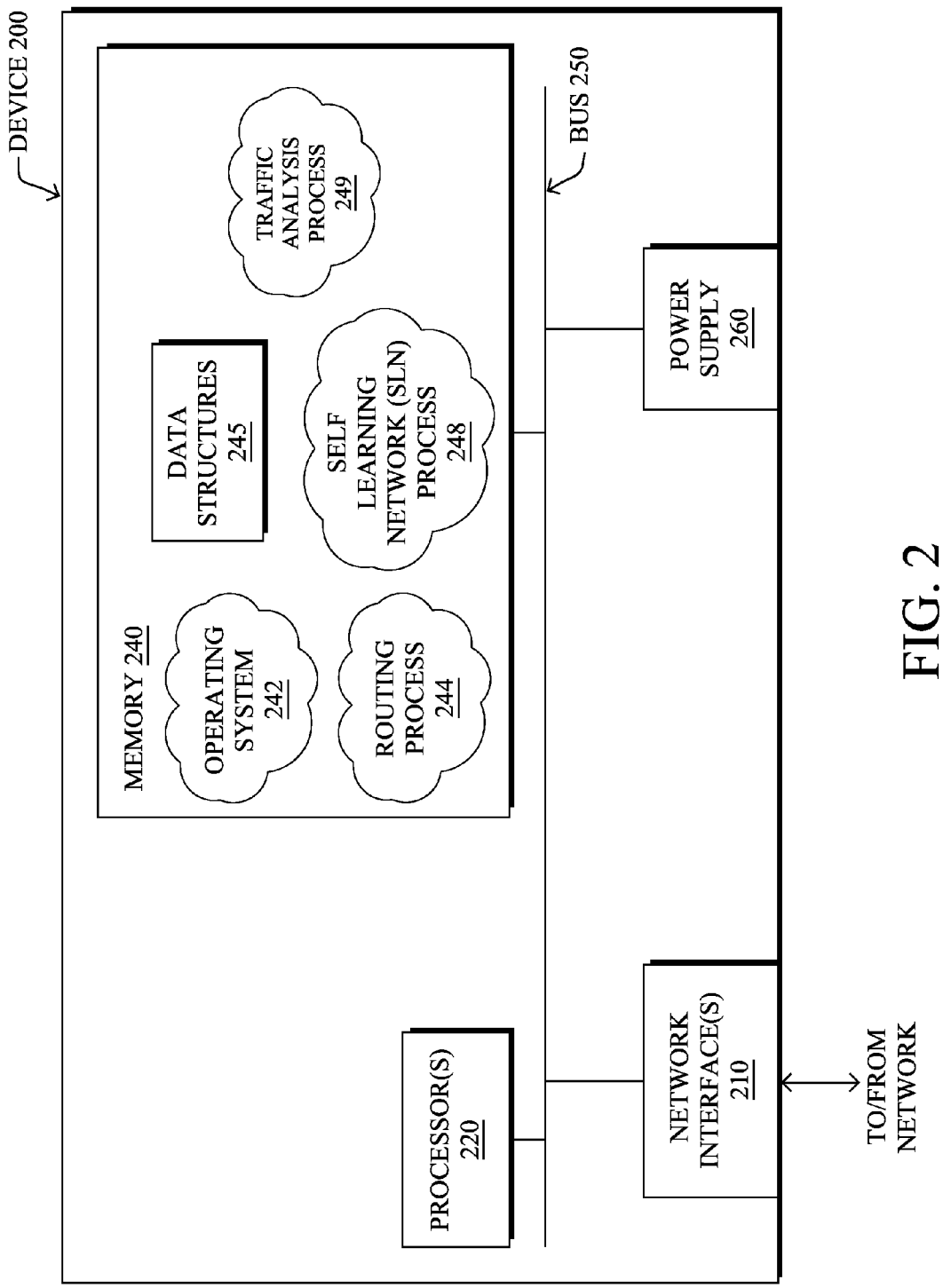
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248 and/or a data visualization process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points).

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

Figure 3:
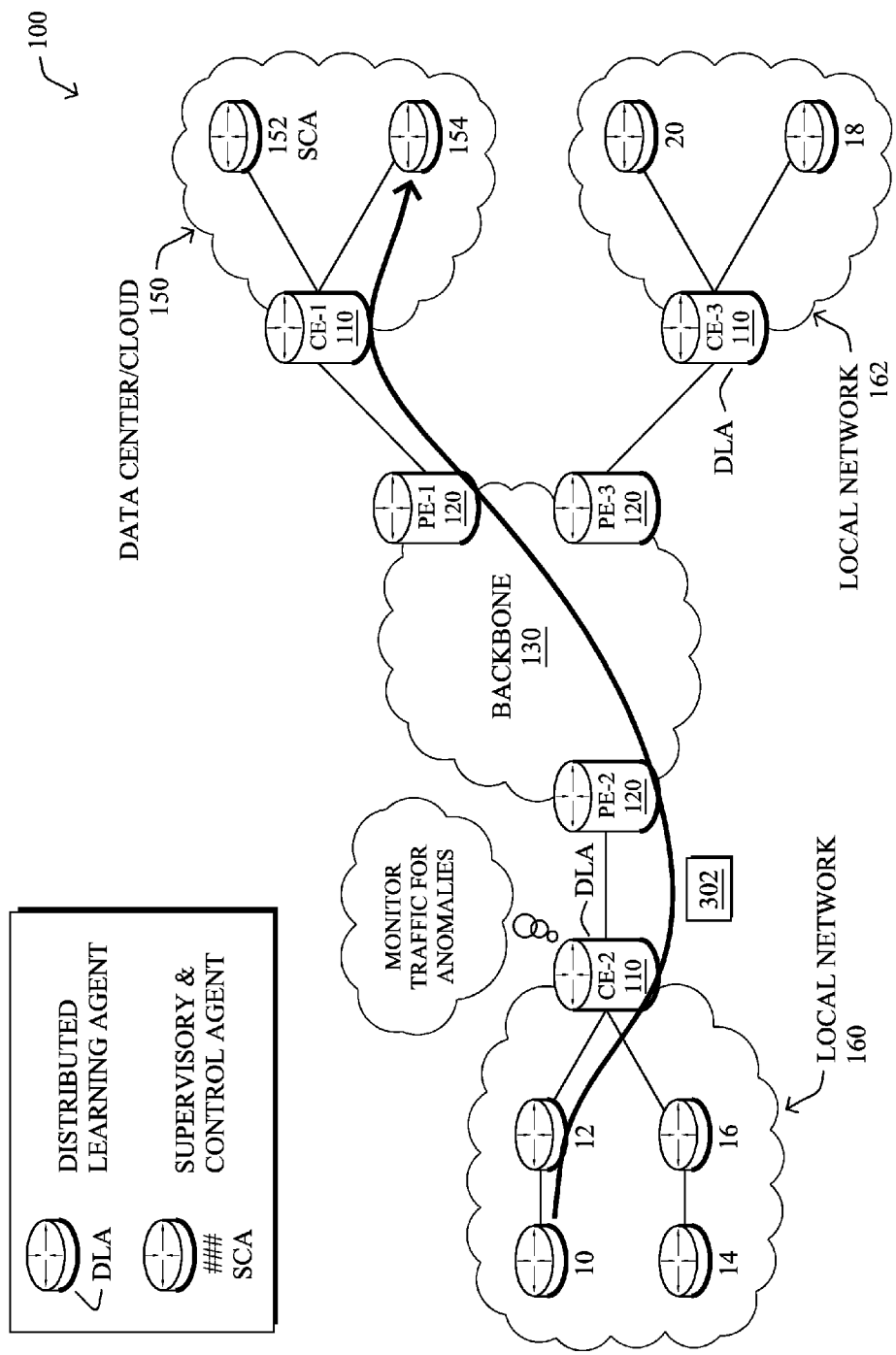
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248 and/or data visualization process 249). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

The main goal of data visualization is to communicate complex information (e.g., highly multi-dimensional data) in a clear and efficient way, so the amount and complexity of information is more accessible and understandable. An efficient visualization should allow the users to quickly have a global understanding of the dataset, as well as to analyze subsets of data in order to detect particular patterns or understand causalities. Typically, visualization web applications are created with a fixed dataset entirely loaded at client initialization or using, e.g., a Representational State Transfer (REST)-based application programming interface (API) containing a full set of data with a unique endpoint. The dataset is usually processed (e.g., cleaned up, consolidated, filtered, etc.) manually before starting to work on the visualization itself. As a consequence, this kind of architecture is rather simple and does not rely on complex data retrieval and reprocessing, as the whole set of information is directly available and organized.

In contrast with existing systems, the SLN architecture described herein may impose a strict constraint on the access to data stored at the edge from centralized systems (and, therefore, visualization clients). Indeed, the information about normal and abnormal flows may be stored in the DLAs (e.g., CE-2/DLA 110, etc.). Furthermore, this information is limited in time due to the limited resources available of the network element hosting the DLA. Hence, the data may not be directly available on the SCA (e.g., SCA 152, etc.).

A naïve approach would be to provide all the information extracted by the DLA from network monitoring mechanisms (e.g., Netflow and/or One PK from Cisco Systems, similar mechanisms, etc.) to the SCA for presentation to the user interface. However, such an approach does not scale given the vast amount of data that would transit through the WAN, which may undercut the bandwidth savings from using a distributed SLN. Accordingly, architectures are disclosed herein that allow for advanced visualization in SLNs, while preserving the distributed nature of SLN and minimizing the impact on the WAN in terms of traffic volume.

The term "visualization" is used herein in a broad fashion and may refer to passive visualization (e.g., visualized data being pushed by the DLA), active visualization (e.g., the user requesting specific data to be visualized), and/or active actuation (e.g., the user triggers specific action in response to the data, such as acknowledging or discarding an anomaly, requesting mitigation, specifying policies, etc.).

Data Visualization in Self Learning Networks

In various aspects, the techniques herein provide a hierarchical architecture for visualizing anomalies in a (distributed) SLN. In one aspect, a distributed visualization module may be operable to store raw or aggregated traffic flow records related to normal/abnormal flows (e.g., Netflow records, etc.) and extract mathematical models from machine-learning processes (e.g., SLN process 248) co-hosted with the visualization module and from flow-related data flagged as abnormal by the system. In another aspect, the distributed device may provide the extracted data to a visualization module hosted by a central agent (e.g., an SCA or other supervisory device) in a compressed form, with or without filtering, using either push-model upon expiration of a timer, in real-time (for anomalies) or during identified quiet period. A second pull-based model may be used upon request (e.g., from a user, etc.), to retrieve compressed data or raw packet traces upon detecting an anomaly for a set of flows (normal and/or abnormal) for a specific past period and potential a given time.

Specifically, according to one or more embodiments of the disclosure as described in detail below, a first device in a network maintains raw traffic flow information for the network. The first device provides a compressed summary of the raw traffic flow information to a second device in the network. The second device is configured to transform the compressed summary for presentation to a user interface. The first device detects an anomalous traffic flow based on an analysis of the raw traffic flow information using a machine learning-based anomaly detector. The first device provides at least a portion of the raw traffic flow information related to the anomalous traffic flow to the second device for presentation to the user interface.

Illustratively, the techniques described herein may be performed by hardware, software, and/or firmware, such as in accordance with the data visualization process 249, which may include computer executable instructions executed by the processor 220 (or independent processor of interfaces 210) to perform functions relating to the techniques described herein, e.g., in conjunction with routing process 244 (and/or SLN process 248).

Figure 4:
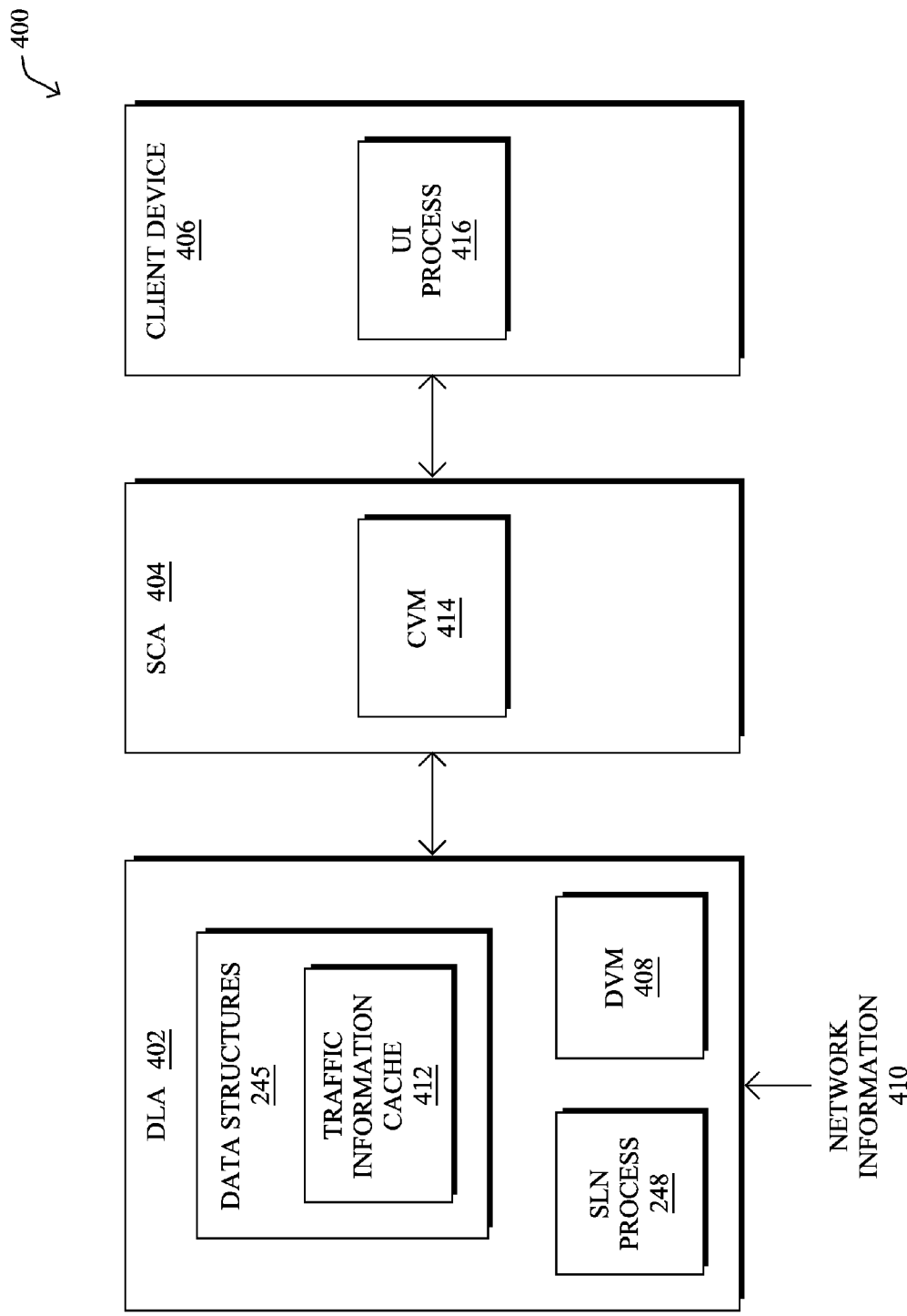
FIG. 4 illustrates an example architecture for visualizing data in an SLN.

Operationally, an example architecture for visualizing data in an SLN is illustrated in FIG. 4, according to various embodiments. As shown, a DLA 402 may be in communication with an SCA 404 which, in turn, is in communication with a client device 406 in the network. As would be appreciated, any number of intermediary devices (e.g., routers, switches, etc.) may exist along the communication pathways between devices 402-406. In various embodiments, each of devices 402-406 may execute a data visualization process (e.g., process 249) that facilitates visualization of data regarding the network. For example, DLA 402 may execute a distributed visualization module (DVM) 408, SCA 404 may execute a centralized visualization module (CVM) 414, and client device 406 may execute a user interface (UI) process 416, which operate in conjunction with one another to enable the mechanisms described herein.

While a single device type is shown for each of devices 402-406, further embodiments of architecture 400 may include any number of DLAs, SCAs, and/or client devices. For example, as described in greater detail above, multiple DLAs may be distributed throughout the network and may be overseen by a single SCA. In another example, multiple client devices may be in communication with one or more SCAs, to provide visualizations of the state of the network to interested users.

In various embodiments, DVM 408 may be a lightweight module that can be deployed to the various DLAs in the network. DVM 408 may be operable to perform any or all of the following: (i) summarize raw traffic information collected by DLA 402 in the form of statistical models and adaptively forwarding (possibly incremental) updates of these models to SCA 404 for visualization; (ii) buffer and cache raw data (e.g., traffic flow data, OnePK data, packets, etc.) to be provided a posteriori (e.g., if the user of client device 406 wishes to view more detailed information about a detected anomaly); and (iii) provide a relevant digest of the cached data when requested by SCA 404, or when a specific triggering event occurs (e.g., detection of an anomaly with very high confidence, etc.). These three roles are described in further detail below.

For purposes of anomaly detection (e.g., by the machine learning-based anomaly detector, SLN process 248), DLA 402 may receive any number of forms of raw network information 410 regarding traffic flows in the network. In various embodiments, information 410 may include traffic flow records and/or other information gathered by existing networking monitoring mechanisms in the network (e.g., Netflow, OnePK, application-specific information, etc.). In another embodiment, information 410 may include copies of packets in the traffic flows themselves. In turn, SLN process 248 may analyze information 410 to detect the presence of an anomaly (e.g., an anomalous traffic flow, etc.) and provide information regarding the detected anomaly to SCA 404.

SLN process 248 may detect anomalous traffic in any number of ways. In some embodiments, SLN process 248 may employ any number of machine learning based models that have been trained using, e.g., raw traffic data that has been previously classified as "normal" and/or "abnormal." In turn, SLN process 248 may compare raw traffic information 410 to the trained model, to determine whether raw traffic information 410 is considered anomalous. For example, assume that raw traffic information 410 indicates that a particular node or set of nodes have unexpectedly increased their generated traffic by a significant amount to a particular address, for a particular application, etc. In such cases, SLN process 248 may determine that the corresponding traffic flow is anomalous. In other cases, SLN process 248 may employ other machine learning techniques, such as those detailed previously.

DVM 408 may operate in conjunction with SLN process 248 to provide data for visualization to the end user client device 406. For example, as shown in FIG. 5A, DLA 402 may aggregate information 410 into one or more statistical models, in various embodiments. In turn, as shown in FIG. 5B, DLA 402 may provide the generated models 502 to SCA 404 periodically, in response to a request from SCA 404, in response to DLA 402 detecting an anomaly, or at any other time.

In the simplest embodiment, models 502 may be merely time averages pushed at regular time intervals. In more sophisticated embodiments, models 502 may include higher moments (e.g., variance, skewness, etc.) and/or whole distributions (e.g., histograms, mixtures of Gaussians, etc.) pushed to SCA 404, in response to DLA 402 detecting a statistically significant change. For example, this can be achieved by computing the Kolmogorov-Smirnov (KS) distance between the previous update and the current state, and trigger a push only if a threshold is met.

Referring again to FIG. 4, DVM 408 may also maintain the raw data in the received information 410 for a period of time. For example, DLA 402 may cache the raw data in information 410 (e.g., Netflow records, OnePK, packets, etc.) in memory first (e.g., in a traffic info. cache 412 in data structures 245) for fast retrieval and then transfer the information to disk/persistent storage after a period of time. In some embodiments, DVM 408 may also discard sets of the raw information as a function of the whether an anomaly has been detected around a particular time (in which case it keeps the corresponding raw data for a longer time) and/or the available resources on the local device (e.g., memory, disk space, etc.). The fundamental idea behind this role is that DVM 408 may then provide, a posteriori and on-demand, detailed data to be visualized regarding a specific anomaly. In other words, under normal circumstances, DLA 402 may only provide compressed/summarized models of the raw data to SCA 404, while still maintaining the underlying raw data, unless circumstances warrant providing at least a portion of the raw data to SCA 404.

In response to receiving a request from SCA 404 or an anomaly event from other modules in DLA 402 (e.g., SLA process 248), DVM 408 may push to SCA 404 a digest of relevant raw entries in its underlying cache. This notion of relevance heavily depends on the type of anomaly, but it is typically inferred from the features that caused the said anomaly. For instance, if a host-based anomaly is detected for a particular host A, then DVM 408 may forward only those flows and packets that correspond to this particular anomaly. Of course, if the user of client device 406 specifically requests it, DVM 408 may provide all raw data corresponding to the said anomaly, assuming this data has not yet been discarded by DLA 402.

As noted, DVM 408 may also implement a caching mechanism on disk whereby older sets of raw traffic data are periodically written to disk, to reduce memory footprint. In one embodiment, this caching mechanism may be combined with an indexing mechanism to keep track of the time periods stored in the corresponding files for efficient searching when the need arises. The data on file can then be periodically pushed to SCA 404, based on set policies, in response to a request or detected anomaly, etc. The cache on disk can also be used to track the time evolution of models themselves should the end user be interested in this information. The time instances and rates at which DVM 408 pushes data to SCA 404 may be completely configurable and controllable by policies, in some embodiments. For example, in one embodiment, data from DVM 408 can be pushed more regularly during lean traffic periods in the network and more reactively during peak traffic periods.

In various embodiments, CVM 414 may be operable to reconstruct a visually accurate dataset on SCA 404, based on the mathematical models provided by the DLAs. For example, as shown in FIG. 5C, SCA 404 may transform model(s) 502 received from DLA 402 into visualization data. In turn, as shown in FIG. 5D, SCA 404 may provide the visualization data 504 to client device 406 for presentation by UI process 416. An initial version of the model may be obtained by SCA 404 from DVM 408 on DLA 402, and then may be updated via (potentially incremental) updates. These models are typically highly compressed versions of the original data. Typically, information may also be lost in the compression process, but in a way that preserves the visual accuracy.

In contrast to compression techniques used for video/image files (e.g., JPEG or similar codecs), the techniques herein do not convey images, but structured data (e.g., traffic matrix, machine learning features, etc.) to be visualized. Notably, while DVM 408 may rely on compression technologies in some specific cases, its primary role is to make decisions regarding the type of compression to be used, whether data must be cached, for how long and in which form (e.g., packet level, Netflow, compressed, etc.), and/or whether a particular event must be pushed immediately because of its criticality. In other words, the data is not just compressed using a compression technique, but first processed and, based on the nature of the data to be reported, the data is transmitted using the appropriate technology. These decisions may be based on multiple parameters, such as the relevance of a particular set of data to a candidate anomaly, the type of target visualization (e.g., topology, historical trends, interactive data exploration), policy, degree of confidence, and/or user settings (e.g., tradeoff between accuracy/responsiveness and traffic overhead).

A key challenge may be to find transforms that preserve the visual accuracy for a specific visualization method. For instance, if one intends to display the time evolution of traffic over a link over an hour, one may turn a large (e.g., 3600 elements if the traffic is measured every second) vector of pairs (e.g., timestamp, bytes) into a Bezier curve that consist of a handful of tuples. Then, if the user of client device 406 wants to zoom into a time interval, CVM 414 on SCA 404 may request a new Bezier curve from DVM 408 on DLA 402, reconstructed from the cache of raw traffic measurements, up to a point where the desired visual accuracy cannot be reached without pushing the raw traffic measurements themselves. Bezier curves are typically also amenable to incremental updates, allowing DVM 408 to only push new points to CVM 414, which then adds them to an existing curve. Other models may also be used, according to various other embodiments. For example, histograms are also very amenable to both incremental updates and high compression of information, especially if one uses variable binning using the minimal description length.

Referring again to FIG. 4, UI process 416 may be configured to present data received from SCA 404 on a user interface device, such as an electronic display coupled to client device 406. In some embodiments, UI process 416 may collect, organize, and maintain a global data model updated asynchronously using the data received from SCA 404. For example, UI process 416 may do so in a dedicated thread (e.g., Web Worker, etc.), to serve this consolidated data model to the visualization thread (e.g., the webpage thread). This component may use raw data from DVM 408 (via SCA 404) and reprocesses it in order to create various representations of the network topology (e.g., a Chord graph, etc.), to cluster the topology elements for each kind of representation, and/or to sort and reorganize the dataset. Once the visualization has been generated, UI process 416 may present the visualization of the network to the user of client device 406, as shown in FIG. 5E. UI process 416 may also retrieve the recent anomalies and use them to validate, and possibly complete, the topology representations. This asynchronous component makes the visualization client very reliable, so it works even if part of the datasets are not available for any reason (e.g., due to disconnected DLAs, network issues, etc.).

In another aspect, a mechanism is introduced that allows the user of client device 406 to explicitly request a set of raw data (e.g., packet traces, etc.) from a given DLA. Upon detecting (and confirming an anomaly), the user of client device 406 inspecting the dataset from SCA 404 via a user interface (e.g., a web-based user interface, an application-based interface, etc.) may want to retrieve more information relative to the anomaly, in particular raw traces collected by the network element (e.g., DLA 402).

In order to prevent a direct communication between the end user (subject to policy rules) and the DLA of interest, the end user may send a request to the SCA via the client device, which will in turn generate a request. For example, as shown in FIG. 5F, client device 406 may provide a request 506 to SCA 404 for raw data related to an anomaly detected by DLA 402. In turn, SCA 404 may send a corresponding request 508 to DLA 502. Such a request may, in one embodiment, be a custom unicast IP message (e.g., a traffic_req( ) request) to the DLA that has reported the flow/event specific of the anomaly.

In one embodiment, the request 508 sent by SCA 404 to DLA 402 may cause DLA 402 to start redirecting flows (e.g., as raw traces or, alternatively, the related Netflow/NBAR records) related to the set of flows (only the anomalous flows or all flows all present with the anomalous flows). In yet another embodiment, request 508 may be extended to flows that were present n-number of seconds prior to the anomalous flow and/or for the period of time T (the period T may be finite or un-specified in which case traffic spanning should stop only upon explicit request from the user). In this embodiment, the relevant data might not be present in memory at DLA 402 (e.g., due to its age of occurrence) and may need to be searched through cache files on disk, as noted previously.

Various mechanisms may further be employed in architecture 400, to prevent the reporting of the raw traffic data from DLAs from affecting the operation of the network. For example, in the event of a massively distributed attack, SCA 404 may pace the requests to a DLA (e.g., request 508), to avoid a considerable amount of traffic being redirected to SCA 404, which may, in turn, lead to a potential attack on the infrastructure itself. In order to prevent such a situation, CVM 414 of SCA 404 may keep track of the set of flows being redirected and pace out the requests to DLA 402 according to the amount of traffic being redirected. For example, this may be done by analyzing the amount of redirected traffic in light of the resources available in the network at the present time. In yet further embodiments, SCA 404 may request DLA 402 to redirect traffic at a given shape (output shaping) and/or given traffic priority or, when available, across a constrained-based path (e.g., a traffic-engineered label switched path (TE LSP), etc.), to avoid interference with the regular traffic. In another embodiment, compression mechanisms could be dynamically invoked along with creation of digests, enabling the data to be sent to SCA 404 using compressed digests containing all the information. This will also not result in proportional data transfer to SCA 404, when massive distributed attacks take place in the network.

Figure 5G:
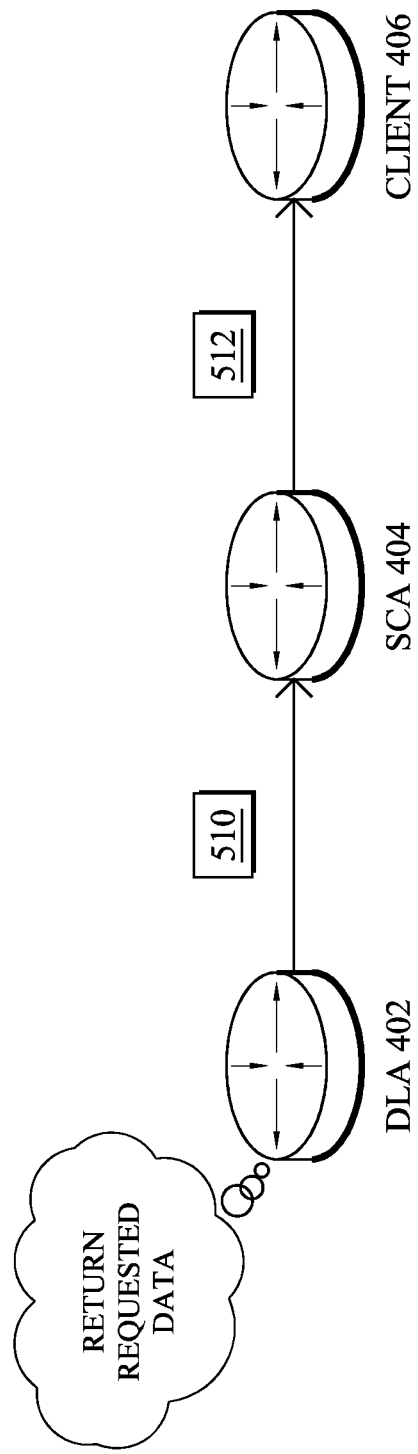

As shown in FIG. 5G, in response to receiving a request 508 for raw traffic information, DVM 408 of DLA 402 may begin gathering the requested data and provide the requested raw data 510 back to SCA 404. For example, DVM 408 on DLA 402 may gather raw data such as the OnePK Data Path Service Set (DPSS), Netflow records or some other packet capture mechanism, application-specific traffic information, etc., that matches the set of criteria of the request. In the first case, raw traces may be retrieved by DVM 408 from a local cache, as described above, and the packet traces may be redirected to SCA 404 using an encrypted tunnel (e.g., a tunnel based on IPS sec, DMVPN, GRE, etc.). Note that payload data may be removed if required by policy in order to preserve confidentiality. In the second case, Netflow or other summarized traffic flow records (and potentially other information related to the flow such as NBAR) may be encapsulated in a custom IP message called the traffic_report( ) message. If low priority, the reported traffic may also be marked with a low priority Differentiated Services Code Point (DSCP) field. In another embodiment, DVM 408 may adjust the size of its cache in case of successive requests with a larger time period than T, and if possible according to its local memory. In response to receiving the raw data 510 from DLA 402, SCA 404 may then transform the raw data into the proper format for visualization and provide the corresponding visualization data 512 to client 406 for presentation to the user.

Figure 6:
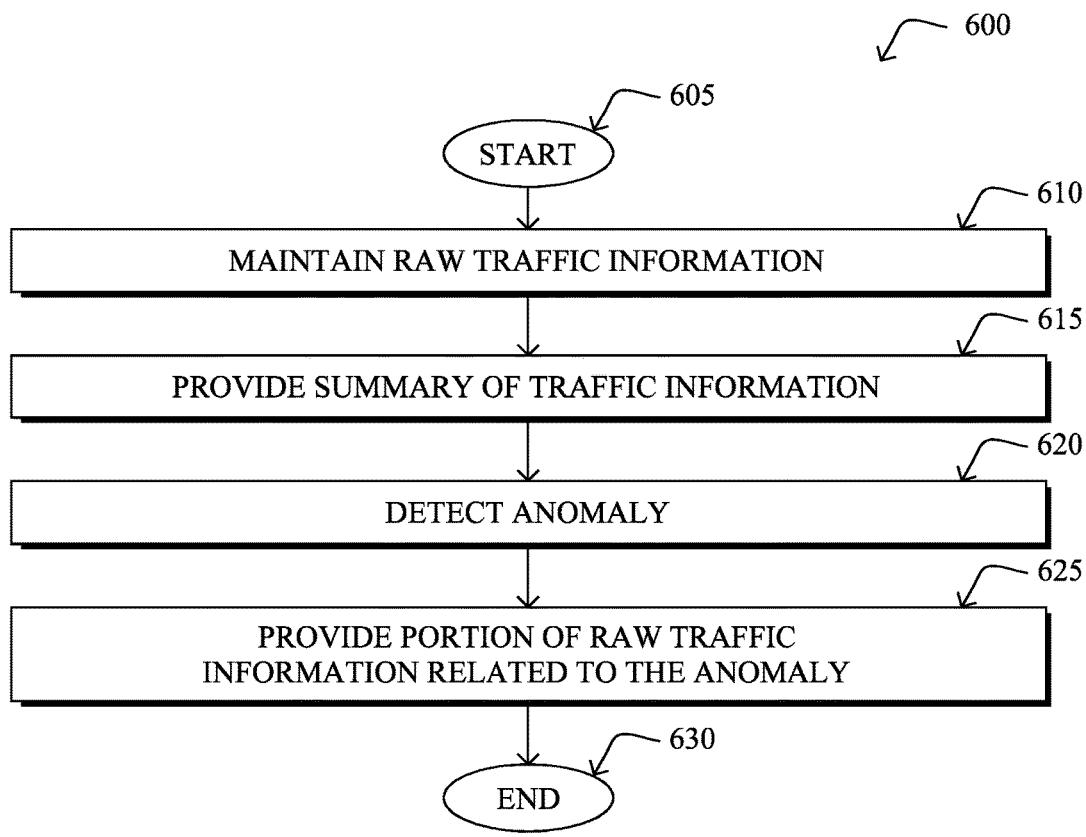
FIG. 6 illustrates an example simplified procedure for providing traffic flow information for presentation to a user interface.

FIG. 6 illustrates an example simplified procedure for providing traffic flow information for presentation to a user interface, in accordance with various embodiments herein. Generally, procedure 600 may be performed by a device in a network (e.g., device 200) by executing stored machine instructions (e.g., processes 248-249, etc.). For example, procedure 600 may be performed by a DLA as part of an SLN. Procedure 600 may begin at step 605 and continues on to step 610 where, as described in greater detail above, the device may maintain raw traffic flow information. In various embodiments, this information may include raw packets and/or information regarding the traffic captured by one or more monitoring mechanisms in the network (e.g., Netflow or similar mechanisms, etc.).

In some embodiments, the device may maintain the raw traffic information by making decisions as to how the information is stored and/or expired by the device. For example, the device may retain recently received traffic information in memory for quicker retrieval and then transfer the information to a disk or other persistent storage after a certain point in time, potentially with an index to facilitate retrieval of the information. In another embodiment, the device may delete the information entirely, after expiration of a certain amount of time. As would be appreciated, these mechanisms may be policy-based and may be a function of the local resources available on the device.

At step 615, as detailed above, the device may provide a summary of the raw traffic information to another device, such as an SCA. In various embodiments, the summary may be a mathematical model that compresses or otherwise limits the amount of information provided to the other device. For example, the summary may be a Bezier curve or histogram constructed from the raw traffic information. In turn, the other device may be configured to transform the summary into visualization data for presentation to a user interface.

At step 620, the device may detect an anomalous traffic flow by analyzing the raw traffic information using a machine learning-based anomaly detector, as described in greater detail above. For example, the device may detect abnormalities in the amount of bandwidth consumed by a traffic flow, the source and/or destinations of the traffic flow, the performance of the traffic flow, etc.

At step 625, as detailed above, the device may provide at least a portion of the raw traffic information related to the anomaly to the other device. In some embodiments, the device may provide the raw traffic information to the other device (e.g., an SCA) in response to receiving a request for the raw information. For example, a user may request additional information surrounding an anomalous traffic flow such as the raw information for the flow itself and/or other traffic flows that were present in the network around the time the anomalous traffic flow was detected. In further embodiments, the device may enact one or more steps to ensure that the reported portion of the raw information does not disrupt other traffic in the network. For example, the device may perform traffic shaping on the provided raw data, provide the raw data as a compressed digest, send the traffic using a DSCP selected based on the severity of the detected anomaly, send the raw data via a path selected so as not to disrupt existing traffic in the network, or the like. Procedure 600 then ends at step 630.

Figure 7:
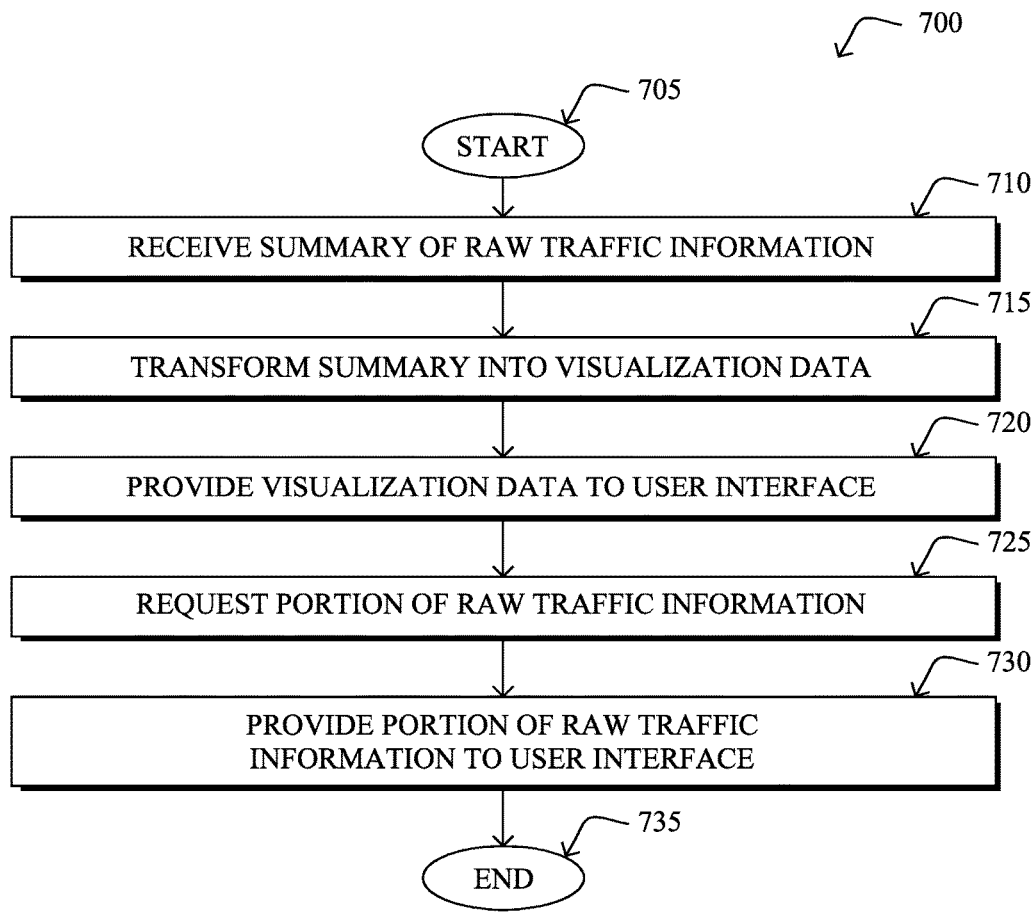
FIG. 7 illustrates an example simplified procedure for processing traffic flow information for presentation to a user interface.

FIG. 7 illustrates an example simplified procedure for processing traffic flow information for presentation to a user interface, in accordance with various embodiments herein. Procedure 700 may begin at step 705 and continue on to step 710 where, as described in greater detail above, a device in a network may receive a summary of raw traffic information from one or more other devices in the network. In various embodiments, the summary may correspond to a mathematical or statistical model constructed based on the raw traffic data. For example, the summary may be a Bezier curve, histogram, etc., generated by the one or more other devices based on raw traffic information maintained by the other device(s).

At step 715, the device may transform the summary of the raw traffic information into visualization data for presentation to a user interface, as detailed above. In various embodiments, the user interface may be a web-based application. For example, the device may employ an application programming interface (API) that communicates with plugins at one or more client devices, to present information regarding the state of the network to a display of a client device. Exemplary methodologies that may be used to implement such an interface may include, but are not limited to, Representational State Transfer (REST)-based services, Simple Object Access Protocol (SOAP)-based services, and the like. Transforming the summary of the raw data into visualization data may be dependent on the type of summary provided (e.g., a histogram, Bezier curve, etc.) and may entail first updating an existing model/summary at the device using the received summary, before generating the visualization data.

At step 720, as detailed above, the device may provide the visualization data to the user interface. For example, the device may provide the visualization data via an API other interface, thereby allowing any number of client devices to display information regarding the network. In one embodiment, the visualization process that implements the user interface may update a global data model for the network asynchronously based on the summary of raw traffic information received in step 710. Such a global data model may then be used to present information regarding the network to the display, as desired by a user of the user interface.

At step 725, the device may request at least a portion of the raw traffic information associated with the summary received in step 710, as described in greater detail above. In some instances, the device may do so in response to receiving a request from the user interface. For example, a user may request detailed information that cannot otherwise be summarized (e.g., by "zooming in" on the visualized operations of the network via the user interface). In another example, the user may request detailed information associated with a detected anomaly such as raw packets of the anomalous traffic flow, information regarding other traffic flows that were present in the network before or during the anomaly, etc.

At step 730, the device may provide the requested portion of the raw traffic information to the user interface, as detailed above. For example, the device may receive the raw data requested in step 725, transform the raw data into visualization data for the user interface, and provide the corresponding visualization to the user interface for display to the user. Procedure 700 then ends at step 735.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the is procedures are not meant to be mutually exclusive.

The techniques described herein, allow for the visualization of anomalies detected by a distributed SLN, while still preserving the bandwidth of the computer network. Notably, the techniques herein allow for efficient visualization without compromising the scalability of the system.

While there have been shown and described illustrative embodiments that provide for data visualization in SLNs, it is to be understood that various other adaptations and modifications may be made within the spirit and scope of the embodiments herein. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   maintaining, by a first device in a self-learning network (SLN), raw traffic flow information for the SLN, wherein the first device includes a distributed learning agent (DLA);
   summarizing, by the DLA, the raw traffic flow information into a summary of the raw traffic flow information obtained by the first device, the summary comprising a statistical model representing the raw traffic flow information obtained the first device;
   transmitting, by the DLA, the summary of the raw traffic flow information to a second device in the SLN, wherein the second device is configured to transform the summary that is presented on a user interface, wherein the second device includes a supervisory and control agent (SCA);
   detecting, by the DLA, an anomalous traffic flow based on an analysis of the raw traffic flow information using a machine learning-based anomaly detector;
   updating, by the DLA, the summary based on the detected anomalous traffic flow;
   adaptively transmitting, by the DLA, at least a portion of the raw traffic flow information related to the anomalous traffic flow to the second device as an update to the previously transmitted summary;
   receiving, by the first device, an instruction from the second device based on the portion of raw traffic flow information related to the anomalous traffic flow and received by the second device; and
   in response to receiving the instruction from the second device, adjusting, by the first device, communications sent from the first device to the second device so as not to interfere with network traffic.

2. The method as in claim 1, wherein the at least a portion of the raw traffic flow information related to the anomalous traffic flow comprises a captured packet of the anomalous traffic flow or a traffic flow record for the anomalous traffic flow.

3. The method as in claim 2, wherein the at least a portion of the raw traffic flow information related to the anomalous traffic flow further comprises information regarding one or more traffic flows that were present in the SLN prior to detecting the anomalous traffic flow.

4. The method as in claim 1, wherein the summary of the raw traffic flow information comprises a histogram or Bezier curve.

5. The method as in claim 1, wherein maintaining the information regarding the SLN comprises:
   storing, by the first device, an indexed portion of the traffic flow information in a persistent memory of the first device, based on a time period associated with the indexed portion of the traffic flow information.

6. The method as in claim 1, wherein adjusting communications sent from the first device to the second device comprises at least one of: adjust a priority or path of the communications, or performing traffic shaping on the communications.

7. An apparatus, comprising:
   one or more network interfaces to communicate with a self-learning network (SLN);
   a processor coupled to the network interfaces and adapted to execute one or more processes; and
   a memory configured to store a process executable by the processor, the process when executed configured to:
      receive from distributed learning agent (DLA) in the SLN a summary of raw traffic flow information from one or more devices in the SLN, wherein the summary comprises a statistical model representing the raw traffic flow information obtained the first device;
      transform the summary of raw traffic flow information that is presented on a user interface;
      transmit the transformed summary of raw traffic flow information to the user interface;
      request at least a portion of the raw traffic flow information from the one or more devices, wherein the requested portion of the raw traffic flow information is an update to the summary related to an anomalous traffic flow;
      transmit the requested at least a portion of the raw traffic flow information to the user interface, wherein apparatus operates as a supervisory and control agent in the SLN; and
      instruct the one or more devices to adjust communications sent from the one or more devices to the apparatus so as not to interfere with network traffic based on the portion of the raw traffic flow information.

8. The apparatus as in claim 7, wherein the summary of the raw traffic flow information comprises a histogram or Bezier curve.

9. The apparatus as in claim 7, wherein the process when executed is further configured to:
   throttle requests to the one or more devices for raw traffic flow information, to prevent further network disruption during a distributed network attack.

10. The apparatus as in claim 7, wherein the user interface is configured to asynchronously update a global data model for the SLN using the transformed summary of raw traffic flow information and the at least a portion of the raw traffic flow information.

11. The apparatus as in claim 10, wherein the apparatus requests the at least a portion of the raw traffic flow information from the one or more devices, in response to receiving a request from the user interface for additional information regarding the anomalous traffic flow.

12. An apparatus, comprising:
   one or more network interfaces to communicate with a self-learning network (SLN);
   a processor coupled to the network interfaces and adapted to execute one or more processes; and
   a memory configured to store a process executable by the processor, the process when executed configured to:
      maintain, by a distributed learning agent (DLA) executing on the apparatus, raw traffic flow information for the SLN;
      summarize, by the DLA, the raw traffic flow information into a summary of the raw traffic flow information obtained by the first device, the summary comprising a statistical model representing the raw traffic flow information obtained the first device;

transmit, by the DLA, the summary of the raw traffic flow information to a device in the SLN, wherein the device executes a supervisory and control agent that transform the summary that is presented on a user interface;

detect, by the DLA, an anomalous traffic flow based on an analysis of the raw traffic flow information using a machine learning-based anomaly detector;

update, by the DLA, the summary based on the detected anomalous traffic flow; and adaptively transmit, by the DLA, at least a portion of the raw traffic flow information related to the anomalous traffic flow to the second device as an update to the previously transmitted summary;

receive, by the DLA, an instruction from the device based on the portion of raw traffic flow information related to the anomalous traffic flow and received by the device; and in response to receiving the instruction from the device, adjust, by the DLA, communications sent from the apparatus to the device so as not to interfere with network traffic.

13. The apparatus as in claim 12, wherein the at least a portion of the raw traffic flow information related to the anomalous traffic flow comprises a captured packet of the anomalous traffic flow or a traffic flow record for the anomalous traffic flow.

14. The apparatus as in claim 13, wherein the at least a portion of the raw traffic flow information related to the anomalous traffic flow further comprises information regarding one or more traffic flows that were present in the SLN prior to detecting the anomalous traffic flow.

15. The apparatus as in claim 13, wherein the summary of the raw traffic flow information comprises a histogram or Bezier curve.

16. The apparatus as in claim 12, wherein the apparatus maintains the information regarding the SLN by:

storing an indexed portion of the traffic flow information in a persistent memory of the apparatus, based on a time period associated with the indexed portion of the traffic flow information.

17. The apparatus as in claim 12, wherein the apparatus adjusts communications sent from the apparatus to the device by at least one of: adjusting a priority or path of the communications or performing traffic shaping on the communications.

* * * * *

UNITED STATES PATENT AND TRADEMARK OFFICE
CERTIFICATE OF CORRECTION

PATENT NO. : 10,484,406 B2
APPLICATION NO. : 14/990064
DATED : November 19, 2019
INVENTOR(S) : Jean-Philippe Vasseur et al.

Page 1 of 1

It is certified that error appears in the above-identified patent and that said Letters Patent is hereby corrected as shown below:

In the Specification

In Column 4, Line 61, please amend as shown:
PLC networks, etc., are often on what is referred to as Signed and Sealed this
Thirtieth Day of June, 2020

Andrei Iancu
*Director of the United States Patent and Trademark Office*